United States Patent
Butler

(10) Patent No.: US 8,756,320 B2
(45) Date of Patent: Jun. 17, 2014

(54) WEB SERVICE GRID ARCHITECTURE

(75) Inventor: James M. Butler, Tyngsboro, MA (US)

(73) Assignee: Grid Nova, Inc., Tyngsboro, MA (US)

( * ) Notice: Subject to any disclaimer, the term of this patent is extended or adjusted under 35 U.S.C. 154(b) by 1845 days.

(21) Appl. No.: 11/423,476

(22) Filed: Jun. 12, 2006

(65) Prior Publication Data

US 2007/0016669 A1  Jan. 18, 2007

Related U.S. Application Data

(60) Provisional application No. 60/699,075, filed on Jul. 14, 2005.

(51) Int. Cl.
  *G06F 15/16* (2006.01)
  *G06F 15/173* (2006.01)
  *H04L 29/08* (2006.01)
  *H04L 12/24* (2006.01)

(52) U.S. Cl.
  CPC ......... *H04L 67/2838* (2013.01); *H04L 67/2823* (2013.01); *H04L 67/1006* (2013.01); *H04L 67/1014* (2013.01); *H04L 41/5038* (2013.01)
  USPC ........... 709/226; 709/203; 709/223; 709/224; 709/225; 709/238

(58) Field of Classification Search
  USPC ................................. 709/203, 238
  See application file for complete search history.

(56) References Cited

U.S. PATENT DOCUMENTS

| | | | | |
|---|---|---|---|---|
| 6,067,545 | A * | 5/2000 | Wolff ............................... | 707/10 |
| 6,889,160 | B2 * | 5/2005 | Sabiers et al. ................. | 702/122 |
| 7,386,620 | B2 * | 6/2008 | Lei et al. ........................ | 709/229 |
| 2002/0143819 | A1 * | 10/2002 | Han et al. ....................... | 707/513 |
| 2004/0111506 | A1 * | 6/2004 | Kundu et al. .................. | 709/223 |
| 2004/0268357 | A1 * | 12/2004 | Joy et al. ........................ | 718/105 |
| 2005/0198200 | A1 * | 9/2005 | Subramanian et al. ........ | 709/218 |
| 2005/0234928 | A1 * | 10/2005 | Shkvarchuk et al. .......... | 707/100 |
| 2005/0273517 | A1 * | 12/2005 | Patrick et al. .................. | 709/238 |
| 2006/0225078 | A1 * | 10/2006 | Anderson ...................... | 718/104 |
| 2006/0294238 | A1 * | 12/2006 | Naik et al. ..................... | 709/226 |

OTHER PUBLICATIONS

Reliability and Availability—EventStudio, As retrieved by Internet Archive on [Feb. 18, 2004], [online], Retrieved from the Internet web.archive.org/web/20040218075842/http://www.eventhelix.com/RealtimeMantra/FaultHandling/system_reliability_availability.htm, pp. 1-7 (as printed).*

Chen et al.; Session-Based Overload Control in QoS-Aware Web Servers; 2002; Retrieved from the Internet <URL: http://ieeexplore.ieee.org/xpls/abs_all.jsp?arnumber=1019296&tag=1>, pp. 1-9 as printed.*

Jacobs, Dean; Distributed Computing with BEA WebLogic Server; 2003; Retrieved from the Internet <URL: cidrdb.org/cidr2003/program/p26.pdf>, pp. 1-11.*

* cited by examiner

*Primary Examiner* — Michael Chao
(74) *Attorney, Agent, or Firm* — Barlow, Josephs & Holmes, Ltd.

(57) ABSTRACT

A system for providing granular functionality called web services to commercial customers includes a web server configured to accept service requests from software application clients, functional implementations of the services, and a means of accounting for usage. The service grid architecture makes practical a reliable commercial provider of web services in the face of unreliable sources of functional implementations. This is accomplished through the commoditization of multiple implementation sources per service, standard forms for each service to which a plurality of sources is adapted, and a rules based approach to source selection per service call.

21 Claims, 6 Drawing Sheets

WEB SERVICE GRID ARCHITECTURE

CROSS-REFERENCE TO RELATED APPLICATION

This application is related to and claims priority from earlier filed provisional patent application Ser. No. 60/699,075, filed Jul. 14, 2005.

BACKGROUND OF THE INVENTION

1. Field of the Invention

The present invention is directed to the commercialization of web services and in particular, to the commoditization of a web services portfolio by syndicating and normalizing multiple sources.

2. Background Information

A "web service" is a program or programs executing on one computer system whose functionality programs on other systems can invoke through some communications network, such as the Internet. Web services have become a popular means of integrating applications within an enterprise or between an enterprise and its business partners.

In addition, there are many examples of potential services that could be offered commercially by a third party. In such a case, an enterprise using commercial web services is a "subscriber" using the web services offered by a web service "provider".

Adoption of commercial web services has been slow, however. One reason for this is that functionally equivalent web services offered by multiple providers are almost never technically equivalent. Thus, changing providers almost certainly requires technical reimplementation even though the business function of the service may be exactly the same. A second reason for slow adoption is that client software using web services can only be as reliable as the web services themselves. The enterprise can mitigate the reliability risk by using multiple providers, but doing so means the difficulty maintaining an increased number of business relationships.

These issues introduce substantial risk and cost to an enterprise desiring to adopt commercial web services as part of their information-technology infrastructure.

SUMMARY OF THE INVENTION

The aforementioned issues inhibiting commercial web service adoption can be mitigated through the use of a "service grid". The grid concept is analogous to that of an electrical power grid wherein a client deals with a single provider on all business and service issues, that provider brokers client access to a power grid, and that grid is supplied with power from multiple origination sources.

In the web service realm, a service grid is managed by a single provider with whom the client enterprise establishes a business relationship and to whom client software interfaces for all service requests. For each service offered, the provider specifies a "standard form" for the request/response protocol, maintains business relationships with multiple service "sources", and adapts the technology of each source to the standard form. As a request for a service is made by a client to the provider, the provider executes a set of rules to select which source to utilize, uses the selected source to complete the service call, and records the event in an accounting system later to be reconciled with source billing. If the selected source is temporarily unavailable, another source may be selected transparent to the client.

Using this service grid concept, a client has the benefit of a single provider business relationship and technical connection, transparent access to multiple service sources without technical disparities among them, and the aggregate reliability of all sources.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
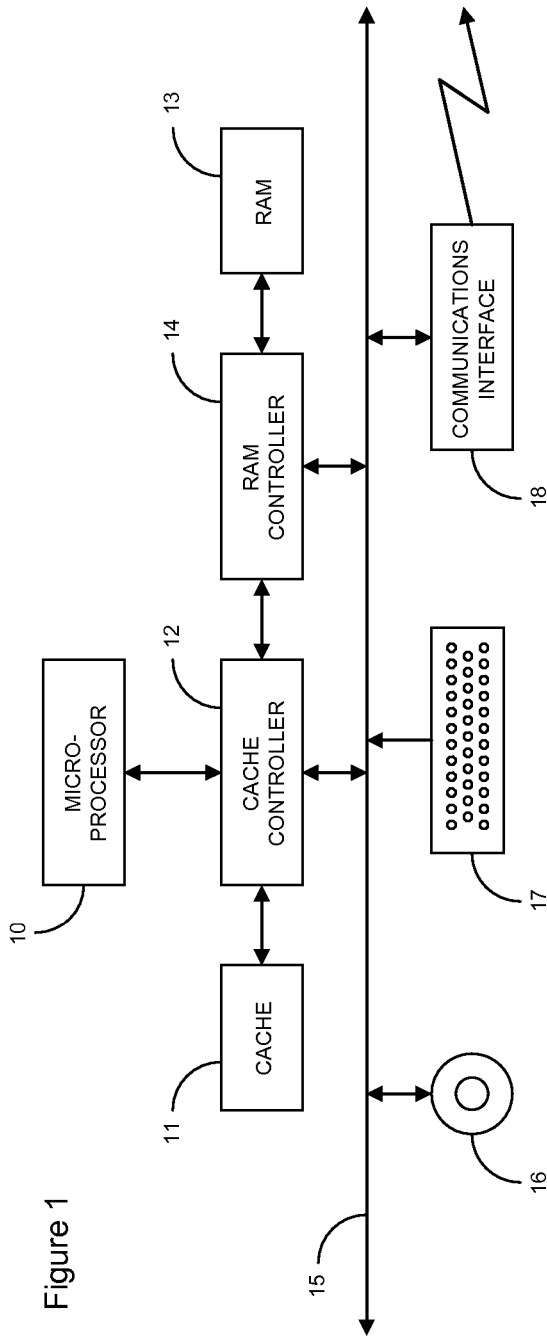
FIG. 1 is a block diagram of a typical computer system that employs the present invention's teachings.

The approach to be descried herein for providing commoditized commercial web services will typically be implemented in computer systems employed for communicating over the Internet and executing web services functionality. The particular type of computer system employed for this purpose is not critical, but FIG. 1 depicts one type of workstation that can be employed in such a system.

Data that a microprocessor 10 uses and instructions for operating on them may reside in on-board cache memory or be received from further cache memory 11, possibly through the mediation of a cache controller 12. That controller 12 can in turn receive such data from system random access memory ("RAM") 13 through a RAM controller 14 or from various peripheral devices through a system bus 15. The memory space made available to an application program may be "virtual" in the sense that it may actually be considerably larger than RAM 13 provides. So the RAM contents will be swapped to and from a system disk 16.

Additionally, the actual physical operations performed to access some of the most-recently visited parts of the process's address space often will actually be performed in the cache 11 or in a cache on board microprocessor 10 rather than on the RAM 13. Those caches would swap data and instructions with the RAM 13 just as RAM 13 and system disk 16 do with each other.

Independently of the particular memory arrangement that a particular workstation employs, it will typically include some type of user-input device such as a keyboard 17 or mouse (not shown). By using such devices, the user enters data and commands as appropriate. In the case of a workstation employed by provider personnel, such devices would be used for, among other things, configuring and monitoring web service execution.

Systems that implement the present invention's teachings will vary widely in architecture. Furthermore, although the provider can in principle be implemented in a single computer program, it will more typically be implemented utilizing a plurality of systems interconnected using a local area network. In all cases, however, the systems described herein will be so arranged as to permit communications between clients and the provider and between the provider and external sources over the Internet. Although provider personnel may use common workstations, a more typical arrangement is for different workstations to be used by personnel of different types. In such a case, the workstation would ordinarily be provided with some kind of communications interface 18 to communicate with other workstations or a common data server so that service grid functions are integrated.

As a baseline for a system that provides web services, consider a computer system configured to operate as a standard web server. Such a system would respond to incoming requests using a set of industry standards, for example, HTTP for a communications protocol, XML as a data structuring mechanism, and SOAP as an XML grammar for encoding request/response interactions. The response would entail executing some functional logic as described by the web service specification, preparing a response, and returning the response to the requester using the aforementioned industry standards. Web service specifications are published by the provider to requesters using industry standards, for example, WSDL as an XML grammar that indicates details such as web service names, inputs, outputs, communication details, and comments describing functionality, and XML Schema for defining data types referenced in WSDL specifications.

As an extension to the baseline, the provider of the web service may syndicate the actual functionality from an external source. In this case, the provider acts as an intermediary brokering the inbound request to the service source for execution. This syndication variant is transparent to the requestor. The advantage of syndication to the provider is access to a larger portfolio of web services since developing a proxy to an external source is usually less costly than implementing and maintaining the actual service functionality. The disadvantages are that the provider's performance and reliability are only as good as those of the external sources, technical variations among sources increases complexity, and accounting detail must be maintained for reconciling usage fees with the sources.

Figure 2:
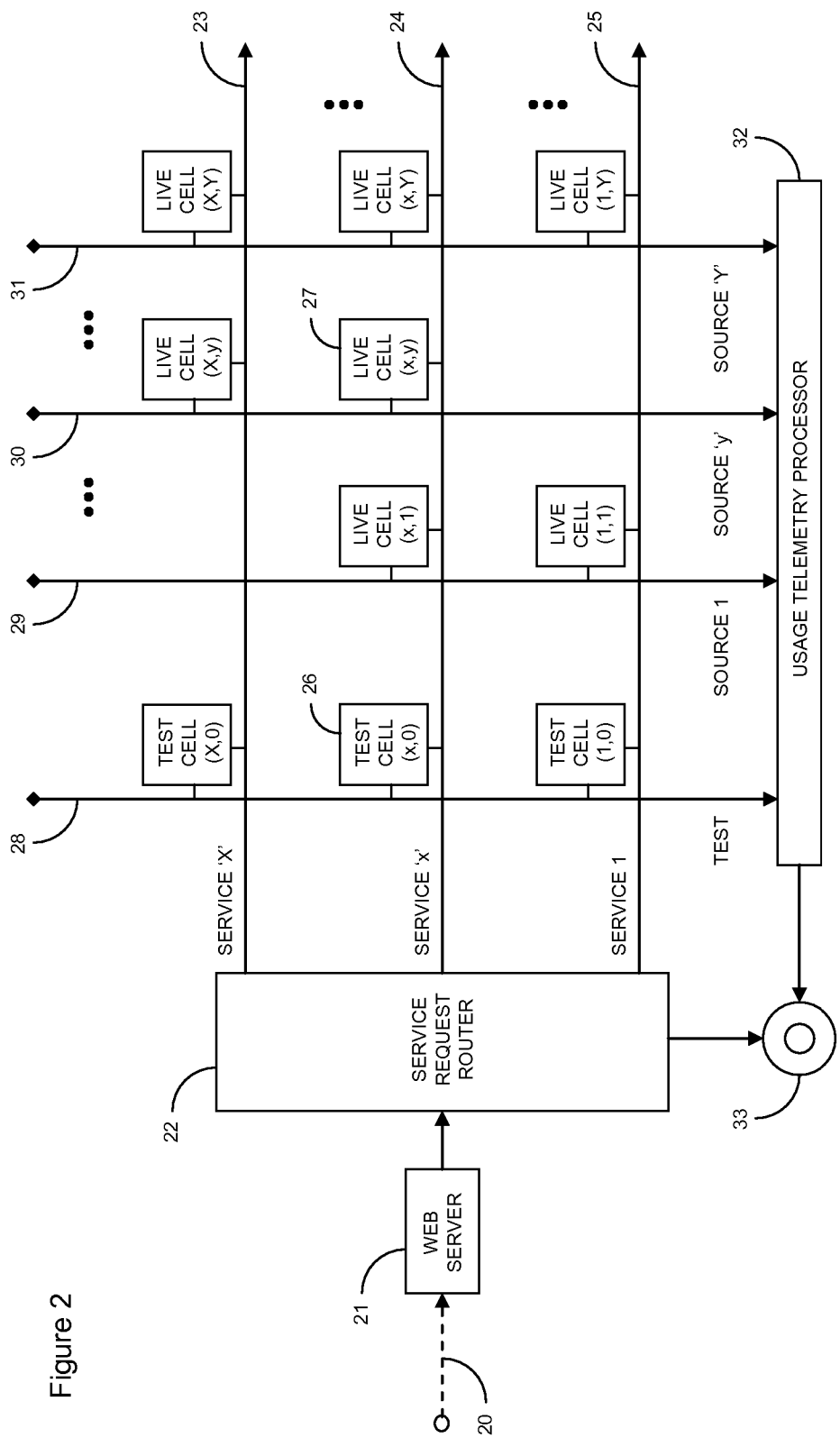
FIG. 2 is a block diagram used to explain the architecture of the service grid and identify its major elements.

The service grid architecture illustrated in FIG. 2 begins to address these issues by commoditizing each service through multiple sources. The issue of technical variation among sources will be addressed in due course. A request enters the system via the Internet 20 through a web server 21 capable of understanding the relevant industry-standard protocols. Upon validating that the request is a valid web service request from a client application within an authenticated and authorized subscriber, the web server 21 forwards the request to the service request router 22. The objective of the service request router 22 is to select from the web service cells on the grid the appropriate cell to handle the request. Upon making the selection by using an apparatus to be described later, the service request router 22 invokes the cell for execution and returns the response back through the web server 21 to the requester. If the selected cell is temporarily unavailable, another appropriate cell may be selected, if one exists, in an attempt to fulfill the request. This select-and-try process continues until either the request is properly fulfilled or it is determined that no cells appropriate to the request are available, at which point an error indication of some sort is returned as the response.

The service grid is a partial array of service cells, each of which implements functionality relevant to a specific web service and is implemented by a specific source. Service cells are denoted live versus test where a live cell implements the specified functionality of a service and a test cell implements predefined test scenarios to facilitate validating requester to provider connectivity. Each particular web service can be implemented by a plurality of sources, and each source implements a subset of the total web service portfolio. In addition to syndicating services from external sources, the provider hosting the grid itself may serve as an internal source for some or all of the services. Test cells are always internally sourced.

Each web service type denoted x in FIG. 2 where $1 \leq x \leq X$, has a message bus that enables the service request router 22 to invoke any of the cells implementing that service. Similarly, each source denoted y, where $1 \leq y \leq Y$ has a source bus that enables an invoked cell to report the event, such events collectively referred to as "telemetry", plus relevant performance characteristics to the usage telemetry processor 32. The usage telemetry processor 32 is a software program that serves as an accounting system that enables the provider to track subscriber activity on the front end for billing purposes and source activity on the back end for paying applicable syndication fees.

For example, consider a request for service x for which service request router 22 has selected source y. The request is routed along service bus 24 to live cell (x, y) 27 for execution, after which the response is sent back via service bus 24 and the usage event data or telemetry is reported via source bus 30. Had the service request router 22 sensed that the request was only a test, it would have selected test cell (x, 0) 26 instead of any live cell.

Messages along a given service bus are requests and responses for that web service type regardless of source thereby commoditizing the service for the requester and all messages along a given source bus pertain to activity of that source regardless of service type thereby facilitating the tracking of all data relevant to the business relationship between the provider and a source. Source selection rules and usage telemetry are maintained on a storage medium 33.

The array of service cells and their interconnections with the service request router 22 and usage telemetry processor 32 can be implemented in a number of ways. One implementation technique is to utilize asynchronous messaging common to commercially available message oriented middleware products. In this technique, each service cell, the service request router 22, and the usage telemetry processor 32 are assigned unique message queues. Any of these entities invokes another by composing the relevant data into a "message" and sending that message to the queue assigned to the destination entity. The destination object listens to its queue, retrieves incoming messages in order, and acts according to their contents. Using this technique, all of these entities can be implemented as separate processes potentially executing on different host computers.

Another implementation technique that is simpler but potentially less robust calls for the design of these entities as objects executing in the same software process. In this technique, the service and source buses are conceptual in nature whereby an entity invokes another entity as a typical software object invocation without the need for interprocess communication.

Still other implementation techniques might use some combination of interprocess and intraprocess communications. Regardless of the implementation technique, however, the essence of the present invention lies with multiple service cells being available to handle a service request, a router capable of choosing and invoking an appropriate cell, and a means of collecting usage data from the cells.

Figure 3:
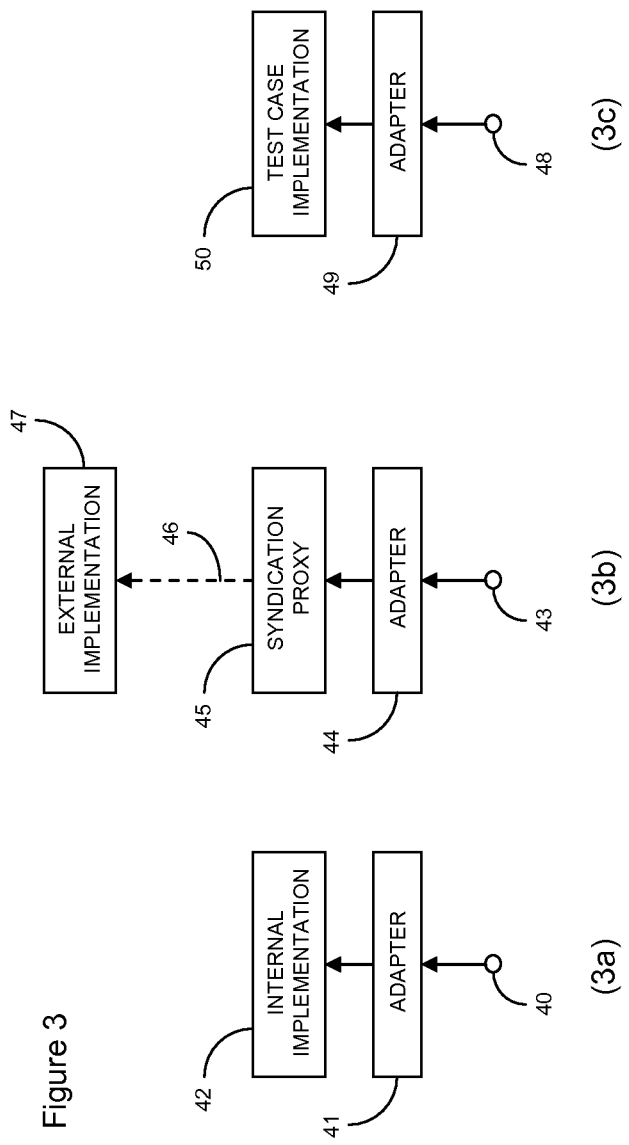
FIG. 3 is a block diagram used to explain in more detail the different types of service implementations that can by plugged into the service grid.

FIG. 3 focuses deeper on the structure of service cells. FIGS. 3a and 3b illustrate the differentiation between internal source and external source live cells. A cell with an internal source has an internal implementation 42 that provides the specified web service functionality. The service interface 40 conforms to the standard form for this web service and the adapter 41 resolves any technical variance between this standard form and the implementation 42. An externally sourced cell also has an implementation 47, an interface 43 that conforms to the standard form of the service, and an adapter 44 to resolve technical variations between the foregoing. However, the implementation 47 is hosted at a location remote with respect the provider and is accessed over the Internet 46 using the syndication proxy 45.

The test cell illustrated in FIG. 3c is an internal cell similar to its live counterpart with an implementation 50, an interface 48 that conforms to the standard form of the service, and an adapter 49 to resolve technical variations between the foregoing. However, the implementation 50 is not the full function of the service, but rather a limited set of fixed responses to predefined test cases.

Common to all service cell types is the notion of an interface that conforms to the standard form for its particular service and an adapter that causes functionally equivalent services to behave in a technically equivalent manner. Technical variations resolved by these adapters might include but are not limited to names of service methods, names of service arguments, data types passed to and retrieved from the service, security models, and qualities of service. Nullification of these technical variances through the use of adapters achieves the commoditization objective of commercial web services.

A further note about the use of adapters is warranted. The need for an adapter 44 in external source cells as depicted in FIG. 3b arises in that multiple external sources of a given service are not likely to conform to any single standard form. Thus, the role of the adapter 44 is to normalize these variations. For an internal source cell as depicted in FIG. 3a, however, one might conclude that an adapter 41 is unnecessary since the internal implementation can always be designed to match the standard form. One the surface, this is true, but there are reasons that validate the usefulness of an adapter 41 for internal cells. On reason is that the standard form of a web service might change over time despite best efforts to keep standard forms stable. When this occurs, an adapter 41 can provide a less invasive alternative to modifying the actual implementation 42 to match the new standard form. This reason also applies to the use of adapters 49 in test cells. Another reason is that a given internal implementation 42 may have been acquired from an external party, essentially starting out life as an external implementation 47. An adapter 41, which may be a copy of an adapter 44, might provide a faster and less complex alternative to modifying or redesigning the acquired implementation to fit the standard.

Figure 4:
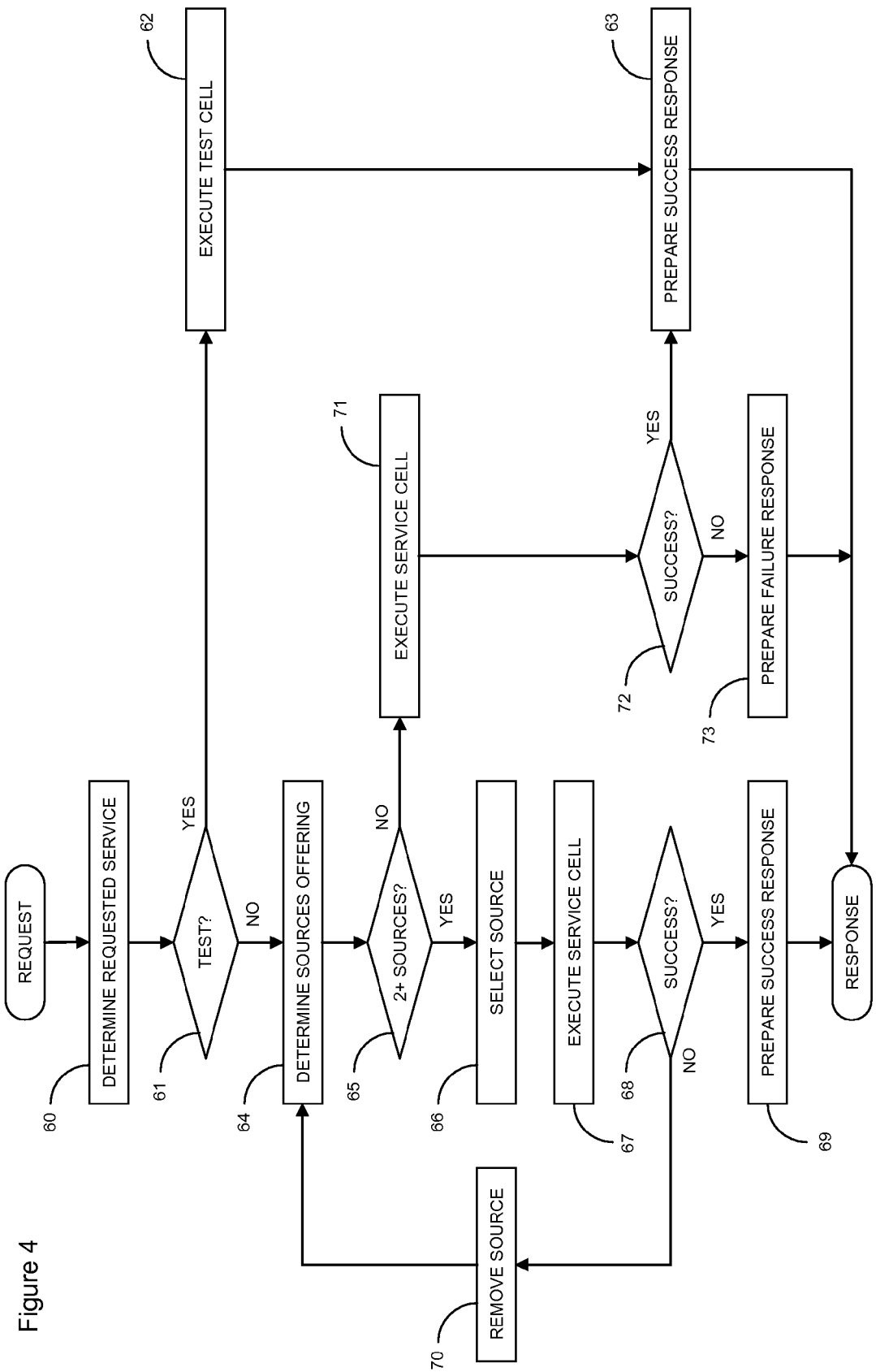
FIG. 4 is a flowchart of a computer routine that depicts how the service grid processes service requests.

When a request is incident upon the system, the service request router 22 is responsible for determining which service cell to invoke. The logic for making this determination is embodied in the flowchart of FIG. 4. The first step 60 is to determine the service requested, denoted herein after as x, which is obtained directly from the request itself. This enables the router to know the correct service bus in the grid. The next step 61 is to distinguish between live and test requests, again in accordance with information including on the request in some fashion. If it is a test request, then the cell must be the test cell of service bus x. That cell is then executed 62, a success response is prepared 63, and that response is returned to the requestor.

Note that in the context of this logic, a success versus failure response relates to the service cell having been available and operating properly regardless of the logical outcome of the service functionality. Furthermore, for the sake of this illustration, internal cells, including the test cells, are assumed to be available since the primary concern of availability in the context of the present invention is the unpredictable availability of external sources and their affect on overall provider availability.

If the request is live (i.e., not a test), then the grid is consulted to determine the sources offering this service 64. If there is only one offering source 65, then selection being trivial, the cell corresponding to that source is executed 71, and in accordance with whether or not the execution is successful 72, either a success response 63 or a failure response 73 is prepared and returned to the requestor. If a plurality of sources offers this service, then a source is selected 66 in accordance with a set of source selection rules to be addressed in due course. The corresponding cell is then executed 67, and if the execution is successful 68 then a success response is prepared 69 and returned to the requestor. If the execution is unsuccessful, i.e., if the source is temporarily unavailable, then that source is removed 70 from the candidate source list 64 and the process repeats. This process iterates until either some source successfully executes or until all sources have failed.

The iterative process of finding an available source among several enables a key characteristic of the service grid architecture namely that the overall availability of a service by the provider is greater than the best availability of any one source of that service. The overall availability of a service x as offered by a provider is characterized by Equation 1, where s is a source offering service x, there are n such sources offering service x, and the function A(x, s) denotes the availability or uptime percentage of service x from source s.

$$A(x) = 1 - \prod_{i=1}^{n} (1 - A(x, s_i)) \qquad \text{(Eq. 1)}$$

Figure 5:
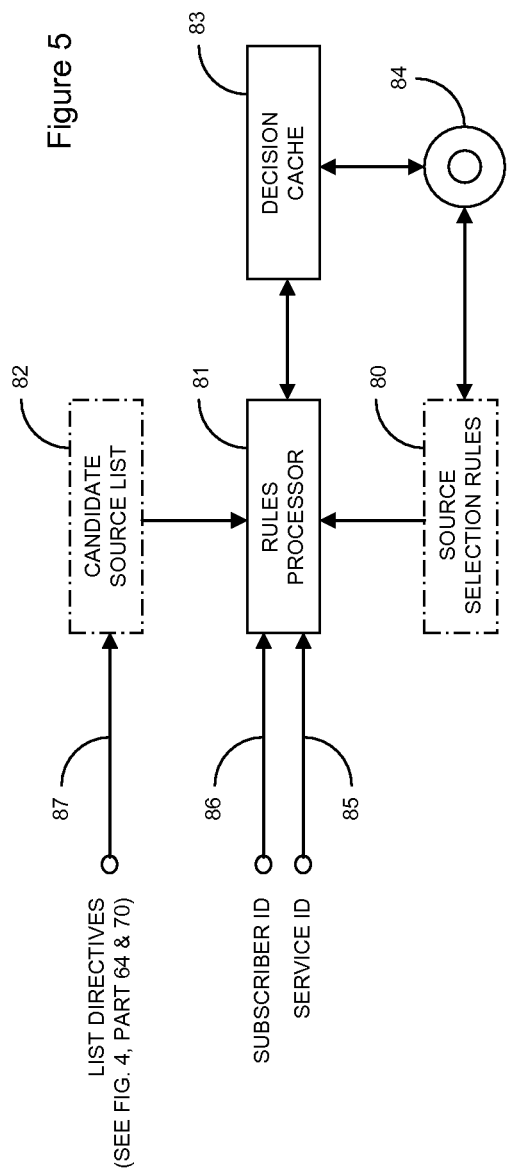
FIG. 5 is a block diagram used to illustrate the structure of the source selection rules processor.

Drilling deeper into the nature of illustrated embodiment's source-selection rules, FIG. 5 provides a block diagram of the rules-processing components. The candidate source list 82 is the set of sources from which the rules processor 81 will select. Prior to the first attempt at source selection for a given request, a list directive 87 populates the candidate source list 82 with all sources on the grid that offer the requested service. This list directive 87 is the result of step 64 in the FIG. 4 flowchart. As FIG. 4 indicates, if a selected source is found to be unavailable, another source is selected. When this occurs, a list directive 87 will cause the candidate source list 82 to remove the unavailable source from its list before the rules processor 81 is invoked for the next iteration. This list directive 87 is the result of step 70 in the FIG. 4 flowchart.

The rules processor 81 is driven by source selection rules 80, which are stored and maintained on a storage medium 84, and by information from the request itself including the web service identifier 85 and the identity of the subscriber 86 with whom the requestor is affiliated. The subscriber identifier is included to enable global source selection rules 80 for a given service to be optionally overridden by a different set of rules for specific subscribers. Recall that these rules 80 are called upon to decide among a plurality of sources to fulfill live service requests. We assume at this stage that test requests and the trivial decision of a single live source are predetermined.

Source-selection rules 80 can be composed of a combination of criteria such as: a) always choose a specific source, b) if this request is part of an established statefull session, always choose the source on which the session was initiated, c) favor an internal source if available, d) favor the source with the best performance over some recent period of time, e) favor the source with the best availability over some recent period of time, f) choose the source with the best pricing thereby reducing provider costs, and g) favor sources in accordance with an ordered list.

As an optimization given that requests from the same subscriber for the same service might be extremely frequent, decisions can be cached 83 and used as follows. When a source selection is made for a given service and subscriber, the decision is sent to the cache 83 and stored in some medium 84. For some period of time thereafter, the likelihood is very high that the rules would render the same selection decision given the same service and subscriber. Therefore, rather than running the selection rules on each request, the cache is consulted for the most recent decision relevant to that service and subscriber. Since conditions that influence selection do change over time, a policy would need to be placed into effect that would flush the cache 83 occasionally, thereby forcing the rules processor 81 to re-evaluate the source selection rules. Flushing of the cache 83 would typically occur whenever a new source is added to the grid, an existing source is removed from the grid, or the source selection rules 80 are modified. In addition, the cache 83 should be flushed every preset period of time to respond to changes in source performance, availability, and/or cost on which some rules 80 may be based.

Figure 6:
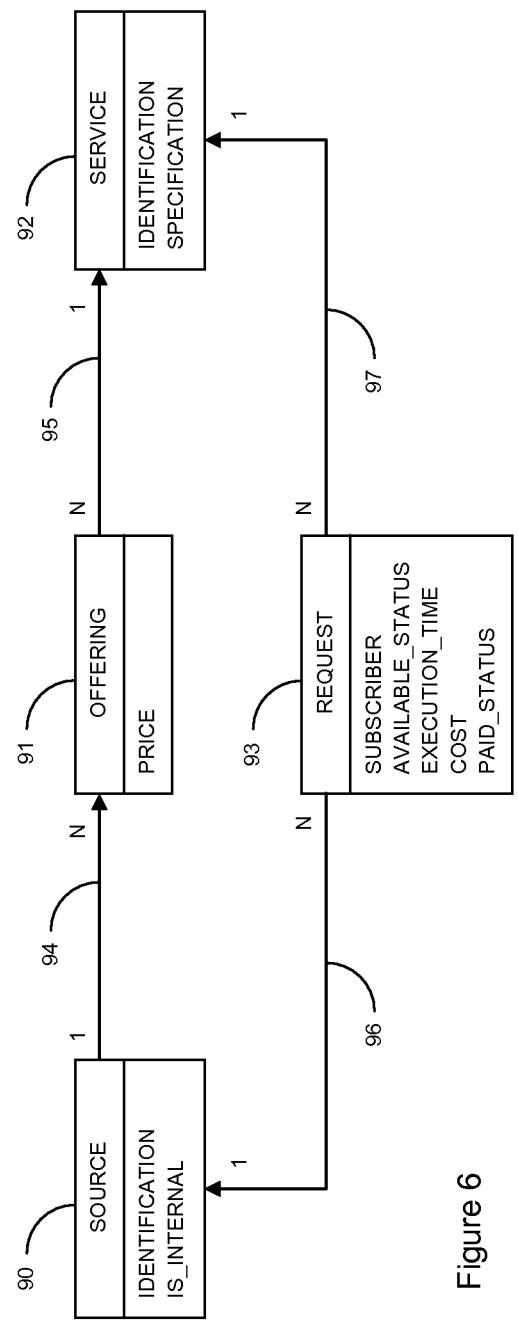
FIG. 6 is a data-structure diagram that illustrates one way of storing the source to service offering relationships and usage telemetry data collected from service grid.

One of the key requirements of managing multiple sources is tracking data that supports the resulting multiple business relationships. FIG. 6 illustrates an important data structure for this requirement. This data structure also provides input into several of the source-selection rule criteria. Sources 90 and services 92 are the anchoring data objects of this structure. A source 90 has at a minimum attributes that indicate its identity and whether or not it is internal or external. A service 92 has at a minimum attributes that indicate its identity and a specification that defines the standard form of the service independently of any sources. An intersecting object called an offering 91 sets up a many-to-many relationship between sources 90 and services 92, whereby a source 90 can have many offerings 92 each mapping to one service 92 and a service can be offered by many sources 90. In addition to these relationships, an offering carries a price attribute that indicates the monetary value currently charged by the source 90 for a use of the service 92.

The source 90, offering 91, and service 92 entities and their relationships are structural in terms of defining the grid. In contrast, the remaining aspects of FIG. 6 pertain to web service usage. Each time a request for a service enters the grid, a new request object 93 is created and related to the requested service 92. Upon source selection, the request 93 is related to that source. The attributes of the request 93 reflect service usage for the purposes of source selection rules and source accounting. These attributes include the identifier of the subscriber with whom the requester is affiliated, a flag indicating whether or not the source 90 was available when the request was attempted, the time required for execution assuming the source 90 was available, the price of the relevant offering 91 at the time of successful request processing, and a flag indicating whether or not this fee has been paid by the provider to the source 90.

The actual implementation of these data structures might vary somewhat to address a number of related functions and concerns, but all will maintain the logical basis described heretofore.

By commoditizing web services across multiple sources adapted to a standard form for each such service, a service grid that employs the invention's teachings can substantially raise the stability, availability, and reliability of commercial web services. These qualities make the concept of commercial web services viable for use in mission critical enterprise information technology systems. The present invention therefore constitutes a significant advance in the art.

It would be appreciated by those skilled in the art that various changes and modifications can be made to the illustrated embodiments without departing from the spirit of the present invention. All such modifications and changes are intended to be covered by the appended claims.

What is claimed is:

1. A web service grid architecture, comprising:
a computer machine including a web server and a service request router;
the web server operating on the computer machine and connected to a computer network; the web server operating on a computer machine and being configured to receive a web service request via a computer machine from a subscriber; and
the service request router operating on the computer machine communicatively interconnected to the web server and to a plurality of service cells each having a respective web service source with respective request forms; at least two of the respective request forms being different than each other; the service cells being configured to fulfill a service request from a requestor, authorized by subscriber and corresponding to a single call, via the web server operating on a computer machine by selecting a single service cell at run time from the plurality of functionally equivalent service cells in a manner that is transparent to the subscriber, to fulfill the request; wherein the single service cell is selected to be a selected service cell at run time from the plurality of functionally equivalent service cells based on performance, cost and availability of the respective web service source for the plurality of functionally equivalent service cells;
wherein the service cells are selected from the group consisting of live cells and test cells;
a service interface having a standard form corresponding to the respective request forms that are different than each other;
an adapter communicatively interconnected to the service interface; the adapter being configured to conform the standard form to the different forms of the web service sources; and
the selected service cell being configured by a computer machine to fulfill the service request from a requestor by a single call directly to the web server without direct communication between the requestor and a web service source; subsequent calls, in a stateful session started by the single call, being automatically forwarded to and automatically fulfilled by the same selected service cell.

2. The web service grid architecture of claim 1, further comprising:
means for collecting tracking data communicatively interconnected to the service cells.

3. The web service grid architecture of claim 2, wherein the tracking data includes at least one of the following: data of identification of a subscriber to a web service, whether a source was available when a request was attempted, time required for execution of a web service, price of a web service at time of processing, whether a fee has been paid to the source of a web service.

4. The web service grid architecture of claim 2, further comprising:
a storage medium connected to the means for collecting tracking data and the service request router; rules for selection of one of the plurality of service cells to fulfill a service request from a requestor authorized by a subscriber via the web server and tracking data concerning attributes of the service request being stored on the storage medium.

5. The web service grid architecture of claim 4, wherein the rules include at least one of the rules of: always selecting a specific source, choosing a source on which the session was initiated if the request is a part of a statefull session, favoring an internal source if available, favoring a source with the best performance over a period of time, favoring a source with the best availability over a period of time, choosing a source with the best pricing, favoring a source according to an ordered list.

6. The web service grid architecture of claim 1, wherein the network is the Internet.

7. The web service grid architecture of claim 1, wherein the service cells are internally implemented.

8. The web service grid architecture of claim 1, wherein the service cells are externally implemented.

9. The web service grid architecture of claim 1, further comprising:
a message queue connected to the service request router and to the service cells.

10. The web service grid architecture of claim 1, further comprising:
a number of executable objects corresponding to the service cells.

11. A method of providing a web service to a requestor using a computer machine, comprising the steps of:
providing a web server operating on a computer machine and connected to a network;
providing a service request router operating on a computer machine communicatively interconnected to the web server;
providing a grid of a plurality of service cells operating on a computer machine, each having a respective web service source; each web service source having an associated performance, cost and availability at run time; at least two of the service cells having request forms different than each other;
receiving a request for a web service in a standard form from a requestor connected to the network from a single call by a computer machine directly to the web server without direct communication between the requestor and a web service source;
conforming the request in a standard form to the different request forms of the at least two service cells;
determining which web service is requested by a computer machine;
determining by a computer machine whether the request for a web service is a test request to trigger use of a test cell in a service grid including both test cells and live cells;
at run time, determining by a computer machine which service cell, from a plurality of functionally equivalent service cells in the grid, is suitable to fulfill the request at run time for a requested web service by the requestor to serve as a selected service cell;
selecting a suitable service cell by a computer machine, at run time, based on performance, cost and availability of the respective web service source for the plurality of service cells;
invoking the selected service cell by a computer machine; and delivering the web service by a computer machine to the requestor using the selected service cell; the identity of which service cell has fulfilled the request for a requested web service being transparent to a subscriber, who has authorized the requestor of the web service;
forwarding subsequent calls, in a stateful session started by the single call, automatically to the same selected service cell; and
fulfilling subsequent calls, in a stateful session started by the single call, automatically by the same selected service cell.

12. The method of claim 11, wherein the network is the Internet.

13. The method of claim 11, wherein the service cell in the grid which is suitable to fulfill the request for a requested web service by the requestor to serve as a selected service cell is determined by at least one rule.

14. The method claim 13, wherein the at least one rule includes always selecting a specific source, choosing a source on which the session was initiated if the request is a part of a statefull session, favoring an internal source if available, favoring a source with the best performance over a period of time, favoring a source with the best availability over a period of time, choosing a source with the best pricing, favoring a source according to an ordered list.

15. The method of claim 11, further comprising the step of:
removing a source from a candidate source list by a computer machine if the source is temporarily unavailable.

16. The method of claim 11, further comprising the step of:
achieving an overall availability of a service from a plurality of sources according to the following by a computer machine where s is a source offering a service x, and there are n such sources offering service x, and the function A(x, s) denotes the availability percentage of the service x from source s:

$$A(x) = 1 - \prod_{i=1}^{n}(1 - A(x, s_i)).$$

17. The method of claim 11, further comprising the step of:
storing a decision in a decision cache for fulfilling a request for a web service relevant to a service and subscriber by a given requestor and subscriber by a computer machine; and selecting a service cell according to the decision in the decision cache by a computer machine.

18. The method of claim 17, wherein the decision cache is flushed when a new source is added to the grid.

19. The method of claim 17, wherein the decision cache is flushed periodically.

20. The method of claim 11, further comprising the step of:
tracking of the fulfillment of web services to a requestor by a computer machine.

21. The method of claim 20, wherein the step of tracking further includes storing at least one of the attributes of identification of a subscriber to a web service by a computer machine, whether a source was available when a request was attempted, time required for execution of a web service, price of a web service at time of processing, whether a fee has been paid to the source of a web service.

* * * * *